United States Patent
Dane et al.

(10) Patent No.: US 9,602,838 B2
(45) Date of Patent: Mar. 21, 2017

(54) METHOD AND APPARATUS FOR AUTOMATIC VISUAL ARTIFACT ANALYSIS AND ARTIFACT REDUCTION

(75) Inventors: Gokce Dane, San Diego, CA (US); Wuttipong Kumwilaisak, Bangkok (TH); Cristina Gomila, Princeton, NJ (US)

(73) Assignee: Thomson Licensing, Issy les moulineaux (FR)

( * ) Notice: Subject to any disclaimer, the term of this patent is extended or adjusted under 35 U.S.C. 154(b) by 1306 days.

(21) Appl. No.: 12/312,646

(22) PCT Filed: Dec. 5, 2007

(86) PCT No.: PCT/US2007/024868
§ 371 (c)(1),
(2), (4) Date: May 20, 2010

(87) PCT Pub. No.: WO2008/088482
PCT Pub. Date: Jul. 24, 2008

(65) Prior Publication Data
US 2011/0075729 A1    Mar. 31, 2011

Related U.S. Application Data

(60) Provisional application No. 60/877,485, filed on Dec. 28, 2006.

(51) Int. Cl.
*H04N 19/124* (2014.01)
*H04N 19/154* (2014.01)
(Continued)

(52) U.S. Cl.
CPC ........... *H04N 19/86* (2014.11); *H04N 19/124* (2014.11); *H04N 19/15* (2014.11); *H04N 19/154* (2014.11); *H04N 19/194* (2014.11); *H04N 19/61* (2014.11)

(58) Field of Classification Search
USPC ..................................................... 375/240.03
See application file for complete search history.

(56) References Cited

U.S. PATENT DOCUMENTS 5,579,121 A * 11/1996 Ohta et al. .................... 386/230
6,529,631 B1 * 3/2003 Peterson et al. .............. 382/232
(Continued)

FOREIGN PATENT DOCUMENTS

JP    10285592    10/1998
JP    10336655    12/1998
(Continued)

OTHER PUBLICATIONS

Wu H R et al: "Video Coding Distortion Classification and Quantitative Impairment Metrics" Signal Processing, 1996., 3rd International Conference on Beijing, China Oct. 14-18, 1996, New York, NY, USA, IEEE, US, Oct. 14, 1996 (Oct. 14, 1996), pp. 962-965, XP010209488 ISBN : 0-7803-2912-0 the whole document.
(Continued)

Primary Examiner — Mikhail Itskovich
(74) Attorney, Agent, or Firm — Brian J. Dorini; Xiaoan Lu

(57) ABSTRACT

A system and method for correcting artifacts present in video frames is disclosed. The system includes a decision module (110) and an artifact correction unit (120). The system receives artifact metrics (112) and artifact maps (122) corresponding to artifacts present in video frames and prioritizes the video frames to be corrected by considering the type and severity of the artifacts and the content of the video frames (113). Subsequent to prioritizing the video frames, the system corrects artifacts of selected frames by adjusting compressed domain parameters (126), such as quantization parameters and mode decisions. An encoder (130) compresses the video frames according to the adjusted
(Continued)

compressed domain parameter to automatically provide a video stream with a lower incidence and severity of artifacts.

22 Claims, 12 Drawing Sheets

(51) Int. Cl.
*H04N 19/194* (2014.01)
*H04N 19/86* (2014.01)
*H04N 19/15* (2014.01)
*H04N 19/61* (2014.01)

(56) References Cited

U.S. PATENT DOCUMENTS

| 7,003,174 B2* | 2/2006 | Kryukov et al. ............. 382/266 |
| 2003/0133624 A1* | 7/2003 | Dantwala ..................... 382/286 |
| 2003/0156642 A1 | 8/2003 | Ruol |
| 2006/0093232 A1* | 5/2006 | Yang et al. .................. 382/254 |

FOREIGN PATENT DOCUMENTS

| JP | 2000101846 | 4/2000 |
| JP | 2005252555 | 9/2005 |
| WO | WO 97/37322 A | 10/1997 |

OTHER PUBLICATIONS

Triantafyllidis George A: "Blocking Artifact Detection and Reduction in Compressed Data" IEEE Transactions on Circuits and Systems for Video Technology, vol. 12, No. 10., Oct. 2002, pp. 877-890.

Kong Hao-Kong et al: "Edge Map Guided Adative Post-Filter for Blocking and Ringing Artifacts Removal", Mitsubishi Electric Research Labs, 201 Broadway, Cambridge, MA 02139, 0-7803-8251-X/04, IEE ISCAS 2004, pp. 929-932.

Kaup Andre: "Reduction of Ringing Noise in Transform Image Coding Using a Simple Adaptive Filter" Siemens Corporate Technology, Munich, Germany, Electronics Letters, vol. 34, No. 22, pp. 2110-2112, Oct. 1998.

Monga Vishal et al: Image Halftoning by Error Diffusion: A Survey of Methods for Artifact Reduction, Department of Electrical and Computer Engineering, The University of Texas at Austin, TX, Hewlett-Packard Laboratories, 1501 Page Mill Road, Palo Alto, CA 94304 Sep. 10, 2003.

Gunturk Bahadir K et al: Multiframe Blocking-Artifact Reduction for Transform-Coded Video, IEEE Transactions on Circuits and Systems for Video Technology, vol. 12, No. 4, Apr. 2002, pp. 276-282.

H.264 Series H: Audiovisual and Multimedia Systems Infrastructure of audiovisual services-Coding of moving video, Advanced video coding for generic audiovisual services, Mar. 2005.

Search report dated Jan. 14, 2009.

* cited by examiner

METHOD AND APPARATUS FOR AUTOMATIC VISUAL ARTIFACT ANALYSIS AND ARTIFACT REDUCTION

CROSS REFERENCES

This application claims the benefit, under 35 U.S.C. §365 of International Application PCT/US2007/024868 filed Dec. 5, 2007 which was published in accordance with PCT Article 21(2) on Jul. 24, 2007 in English and which claims the benefit of U.S. provisional patent application No. 60/877,485 filed Dec. 28, 2006.

TECHNICAL FIELD

The present principles generally relate to the processing of video data and, more particularly, to the correction of artifacts within a video data stream.

BACKGROUND

Compression of video data inherently involves reduction of picture quality to increase data storage efficiency and/or reduce the required transmission bandwidth. Although the object of compression algorithms is to eliminate only imperceptible characteristics of a video frame, often times the compressed video frame includes noticeable imperfections known as artifacts. Common compression artifacts include blocking, banding, dark patches and ringing artifacts, which may be present at both low and high compression ratios.

Various methods for reducing artifacts and artifact severity are performed as post-processing operations after the compressed video data stream is decoded. One example of a post-processing technique is adaptive filtering, as described in H. S. Kong, A. Vetro, H. Sun, "Edge map guided adaptive post-filter for blocking and ringing artifacts removal", *IEEE International Symposium on Circuits and Systems* (ISCAS), vol. 3, pp. 929-932, May 2004, and A. Kaup, "Reduction of ringing noise in transform image coding using a simple adaptive filter", *Electronics Letters*, vol. 34, no. 22, pp. 2110-2112, October 1998. Additionally, V. Monga, N. Damera-Venkata, B. L. Evans, "Image Halftoning by Error Diffusion: A Survey of Methods for Artifact Reduction", *Journal of Electronic Imaging*, 2003 offers a description of dithering. However, to ensure high picture quality and a very low incidence of artifacts, artifacts should be corrected during the compression stage of video processing.

For compression methods using a discrete cosine transform (DCT), a known method of such compressed domain processing comprises altering some of the quantized DCT coefficients. The DCT coefficients represent the power of each frequency present in a given image block. For most image blocks, after DCT transformation the majority of signal energy is carried by just a few of the low order DCT coefficients. These coefficients need to be more finely quantized than the higher order coefficients in order to avoid introducing visible artifacts. Altering a quantized DCT coefficient can either reduce or enhance the perception of compression artifacts.

B. Gunturk, Y. Altunbasak, R. M. Merserau, "Multi-frame blocking-artifact reduction for transform-coded video", *IEEE Trans. on Circuits and Systems for Video Technology*, vol. 12, no. 4, April 2002, discloses an example of altering a quantized DCT coefficient by using a projection onto a convex set approach. Alternatively, G. A. Triantafyllidis, D. Tzovras, M. G. Strintzis, "Blocking artifact detection and reduction in compressed data", IEEE Trans. on Circuits and Systems for Video Technology, vol. 12, no. 10, October 2002, describes a method of optimizing the quantization of a DCT coefficient by minimizing an error criterion in the transform domain. Moreover, other compression domain parameters may be altered to reduce the severity of artifacts. For instance, Ruol, U.S. Publication No. 2003/0156642 A1, discloses a method of reducing the severity of artifacts in a video stream in a two-pass encoder by adjusting the quantizer step size for macroblocks of a frame that are identified in an artifact map.

However, the known methods described above fail to address the problem of utilizing limited encoding system resources (e.g., bit budget and/or encoding time) in an efficient manner to eliminate or reduce the severity of artifacts by adjusting compressed domain parameters such as mode decisions or quantization parameters. Specifically, known methods do not prioritize video frames by considering different types of artifacts within video frames or the content of the video frames to adjust mode decisions or quantization parameters.

SUMMARY

In accordance with the present invention, a video processing method is disclosed. One aspect of the present invention includes correcting a video picture in response to the generation of several measurements (metrics) corresponding to various types of artifacts present in a video picture. Other embodiments of the present invention include selecting and prioritizing video pictures included in a sequence of pictures in accordance with the metrics and the content of the video pictures. Moreover, according to another aspect of the present invention, the correction is performed by adjusting at least one of a quantization parameter and a mode decision corresponding to at least one block of a picture.

The present invention may also be embodied in a video processing system comprising an artifact correction unit configured to generate compressed domain parameters in response to a plurality of metrics corresponding to a plurality of video compression artifact types present in a video picture included in a sequence of video pictures; and an encoder configured to correct the video picture in accordance with the compressed domain parameters. Consistent with other embodiments of the present invention, the artifact correction unit may be configured to select and prioritize video pictures included in a sequence of pictures in accordance with both the metrics and the content of the video pictures. Moreover, the artifact correction unit and the encoder may be adapted to correct a video picture by adjusting at least one of a quantization parameter or a mode decision corresponding to at least one block of a picture.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations or an apparatus storing instructions for performing a set of operations. Other aspects and features will become apparent from the following detailed description considered in conjunction with the accompanying drawings and the claims.

DETAILED DESCRIPTION

The present principles are directed to efficiently utilizing limited resources to eliminate or reduce the severity of artifacts by adjusting compressed domain parameters such as mode decisions or quantization parameters. One aspect of the present principles includes prioritizing video frames for correction by considering the severity of different types of artifacts present in a frame. Furthermore, as certain types of artifacts tend to be more prevalent than others in certain types of video content, the content of the video stream may also be considered when prioritizing video frames. Thus, the present principles thereby utilize encoder system resources in an efficient manner to correct the most perceptible artifacts in a compressed video stream by adjusting compressed domain parameters such as mode decisions or quantization parameters.

There are several types of artifacts that may be corrected by the present principles. One such common artifact includes a blocking artifact, characterized by visible edges of blocks of pixels in a frame. Specific blocking artifacts include chroma blocking and luma blocking artifacts. Banding artifacts, another common artifact correctable by the present principles, appear as the perception of distinctive color bands in gradual color transitions. Additionally, the perceptibility of mobile areas, such as dark patches, mosquito noise and ringing artifacts, may also be reduced according to implementations of the present principles. However, it should be noted that the types of artifacts described above are non-limiting examples and the present principles may be applied to other types of video compression artifacts as well.

Figure 1:
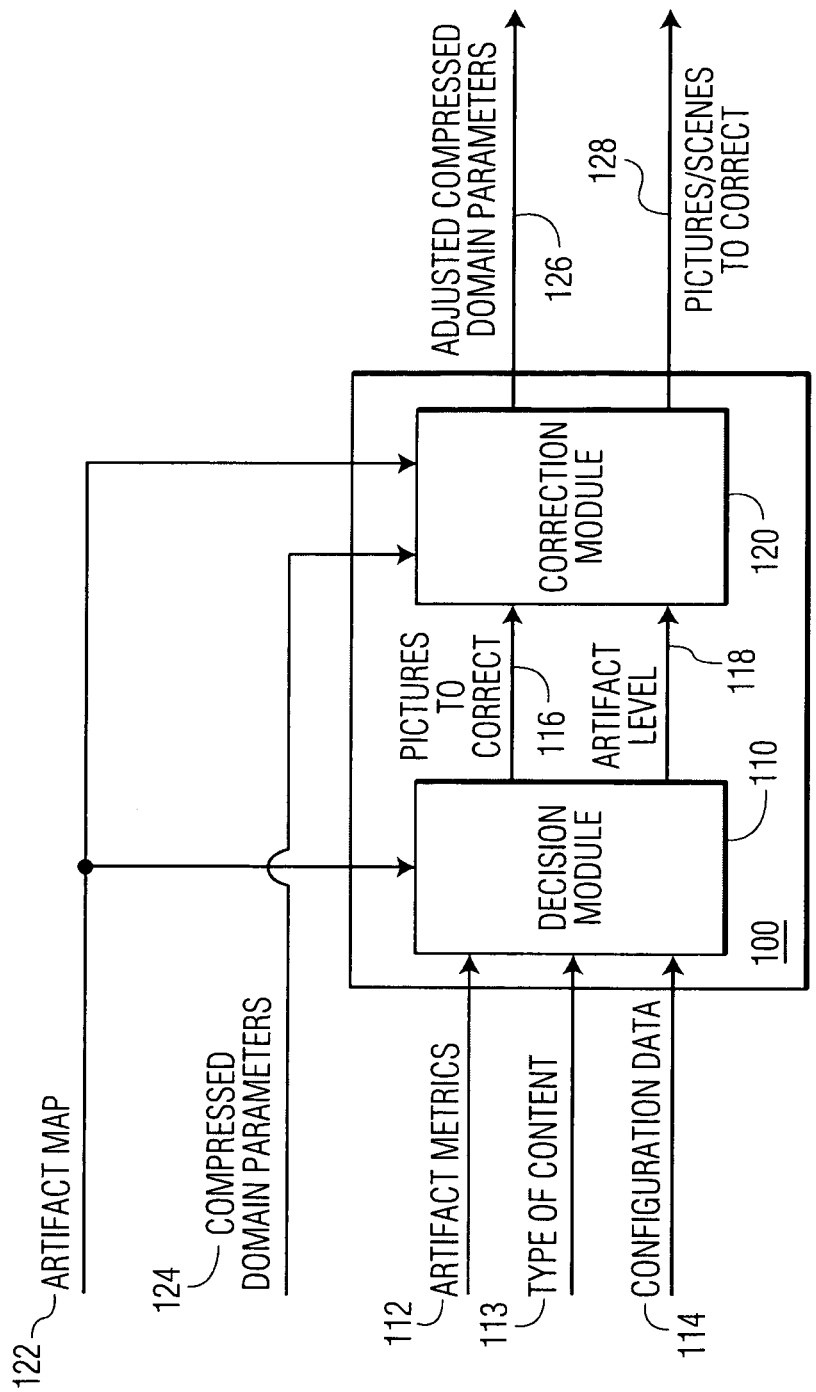
FIG. 1 is a block diagram of an exemplary artifact correction unit.
Figure 2:
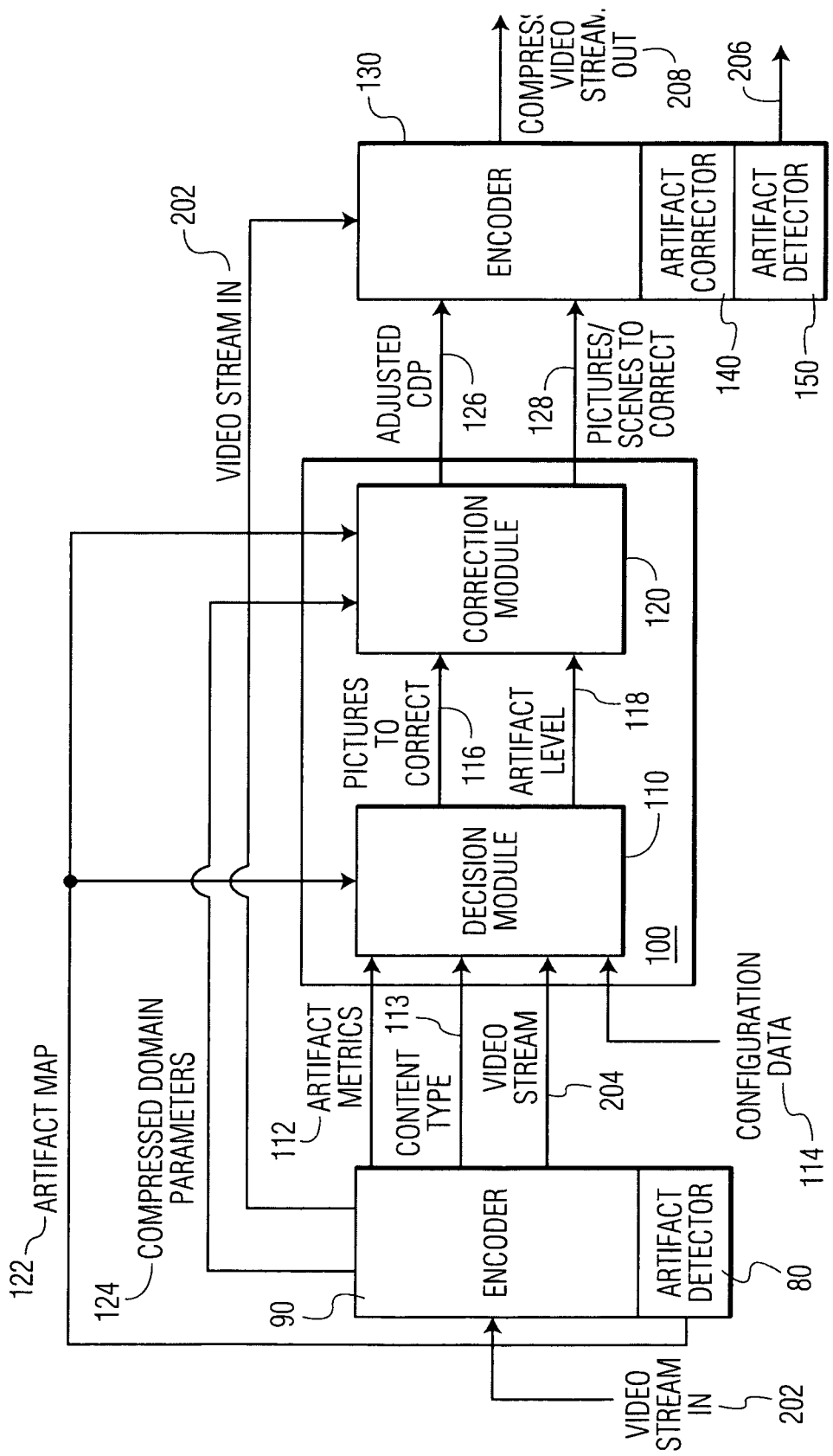
FIG. 2 is a block diagram of an illustrative example of a multi-pass encoding system incorporating an artifact correction unit.

Referring in specific detail to the drawings in which like reference numerals identify similar or identical elements throughout the several views, and initially to FIG. 1, an exemplary artifact correction unit 100 according to an aspect of the present principles is shown. The artifact correction unit 100 may comprise a decision module 110 and a correction module 120. FIG. 2 provides an example of the artifact correction unit in a multi-pass video encoding system having encoders 90 and 130, which may optionally include artifact detectors 80 and 150, respectively. The encoder 130 may also include an artifact corrector 140, the function of which is further described below. The artifact corrector 140 could have the ability to process the pictures prior to encoding in order to prevent the creation of compression artifacts during the encoding process.

A video stream input 202 is received by the encoder 90 and after processing in accordance with the present principles, as more fully described below, a corrected compressed video stream 208 is output by encoder 130. The compressed video stream 208 may be provided to another encoder for an additional correction pass, including an indication of the presence of artifacts 206 provided by the artifact detector 150. Alternatively, the artifact detector 150 may report the presence of artifacts 206 in the final bit stream.

Figure 3:
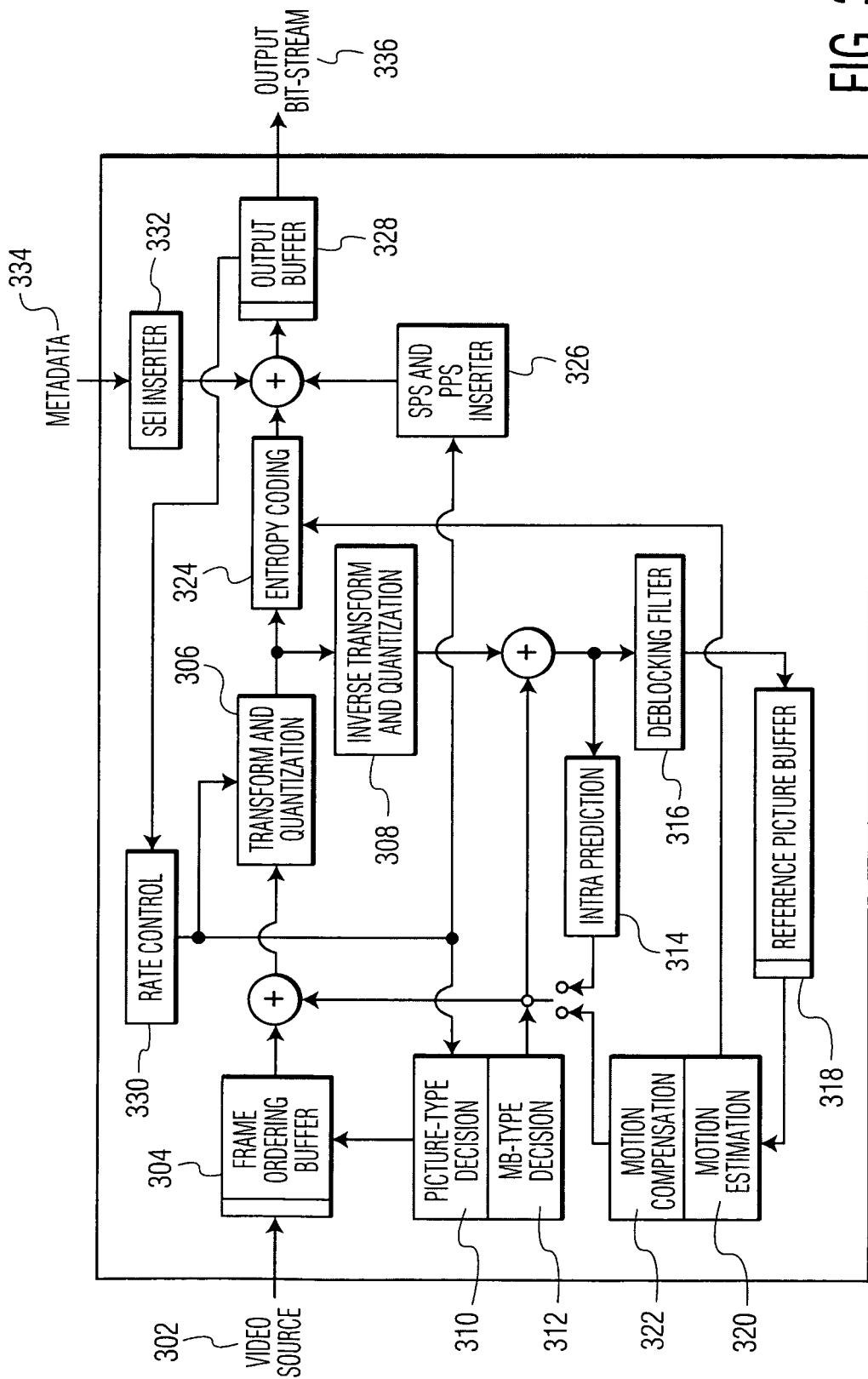
FIG. 3 is a block diagram of a typical encoder that may be utilized according to an implementation the present principles.

An example of a typical encoder 300 that may be employed with the present principles is depicted in FIG. 3. Such an encoder may include the following elements: a frame ordering buffer 304 configured to receive an input video stream 302, a transform and quantization module 306, an inverse transform and inverse quantization module 308, an intra prediction module 314, a deblocking filter 316, a reference picture buffer 318, a motion estimation module 320, a motion compensation module 322, a picture-type decision module 310, a macroblock-type decision module 312, an entropy coding module 324, a sequence parameter set and picture parameter set inserter 326, a supplemental enhancement information inserter 332 configured to process metadata 334, a rate control module 330, and an output buffer 328 configured to output an encoded video data stream 336.

Returning to FIGS. 1 and 2, the process according to an implementation of the present principles begins by generating units of measure of artifacts, artifact metrics 112, and an artifact map 122 corresponding to a frame in a video stream. An artifact map illustrates the locations of artifacts in each picture and may indicate the type of artifact, which may include blocking, banding, dark patch, ringing artifacts or other types of video compression artifacts. The artifact map may also indicate the existence or severity of artifacts within a fixed size block, such as 8 pixels by 8 pixels, or blocks of arbitrary size. Conversely, artifact metrics include an indication of the severity level of each type of artifact present in a frame as a whole. According to one implementation, the artifact metrics and artifact map are generated by encoder 90 via artifact detector 80, as depicted in FIG. 2, after compressing the video frames according to the parameter configuration of a given video compression method, which may include one or more of a quantization parameter, mode decision, reference frame selection and bit rate allocation. However, it should be noted that the artifact map and artifact metrics may be generated by any type of compression operator.

Subsequent to their generation, the artifact map 122 and artifact metrics 112 are transmitted to the decision module 110 in addition to a compressed video stream 204. Configuration data 114 may also be provided to the decision module 110 by encoder 90 or any other type of operator. According to another aspect of the present principles, configuration data 114 may be included in a default file in the decision module 110. In one implementation of the present principles, the configuration data comprises the available bit rate of the compressed video stream that may be used by the artifact correction unit 100. For example, if the target bit rate of the video stream is 10 Mbps and the bit rate of the video stream after compression by encoder 90 is 9 Mbps, the available bit rate that may be used by artifact correction unit 100 to correct artifacts is 1 Mbps. Moreover, configuration data may also include the minimum or maximum percentage of pictures that the artifact correction unit should correct. According to another aspect of the present principles, the type of video content compressed 113, such as animation content, movie content, or other relevant content type may additionally be provided to the decision module 110 by encoder 90 or any other type of operator.

Figure 4:
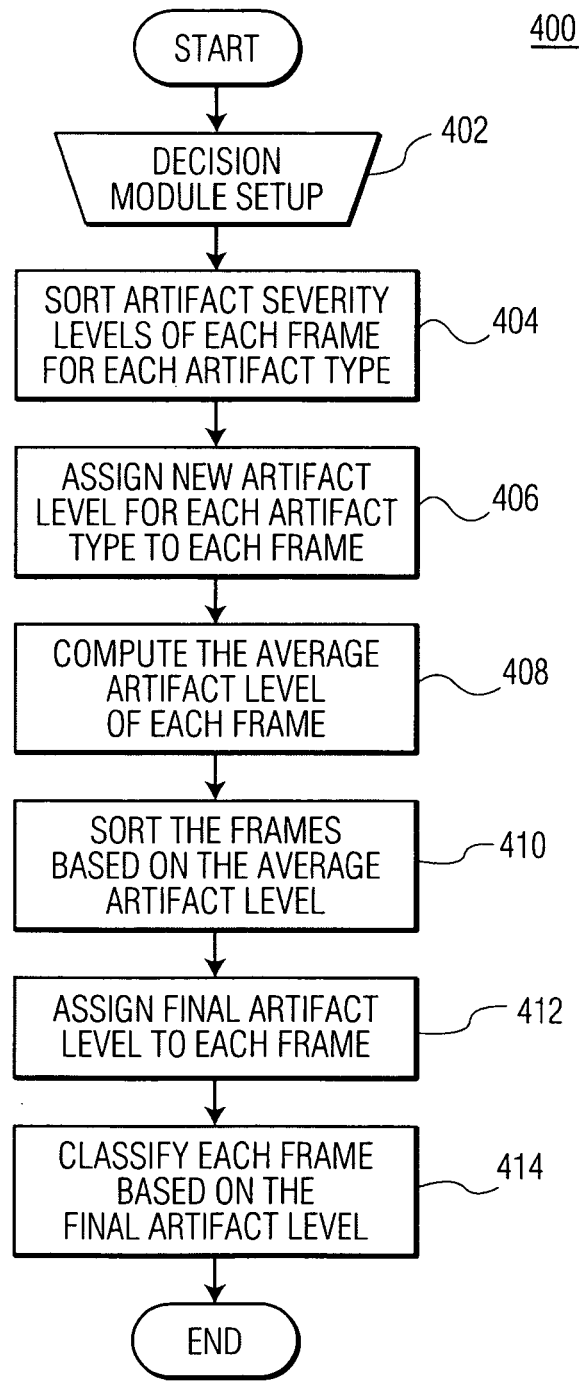
FIG. 4 is a flow diagram illustrating an example of a prioritization process based on various artifact strengths and types performed by a decision module.

The process performed by the decision module 110 in accordance with a particular implementation of the present principles is depicted in FIG. 4. As discussed above, the decision module 110 receives artifact metrics 112 and an artifact map 122, which may occur during the decision module setup (step 402). The artifact metrics provide information from which it can be inferred directly or indirectly the severity level of each type of artifact present in a particular frame. For example, if a frame has luma blocking artifacts, chroma blocking artifacts, banding artifacts and dark patch artifacts, the artifact metrics specify four values of artifact strengths for that frame. After receiving the artifact metrics and artifact map in the decision module setup, the decision module 110, or alternatively, the artifact detector 80, compiles a list of artifact strengths corresponding to different frames for each type of artifact. By way of a non-limiting example, as depicted in the left portion of FIG. 5, the decision module 110 may compile a list for chroma blocking artifacts with entries of the chroma blocking strength levels corresponding to each frame.

Figure 5:
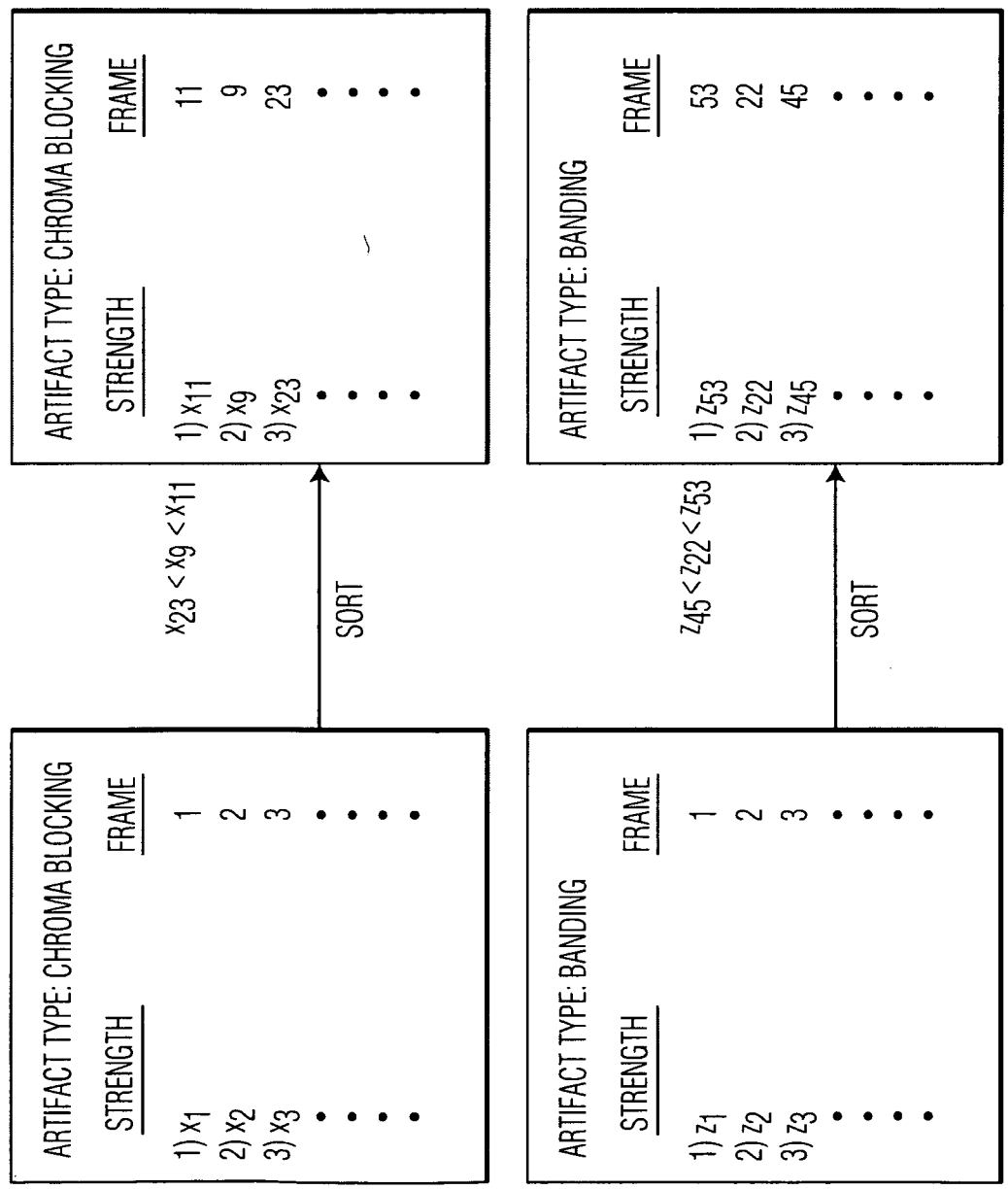
FIG. 5 is a flow diagram depicting exemplary artifact lists based on various artifact types that are compiled and sorted by the decision module.
Figure 6:
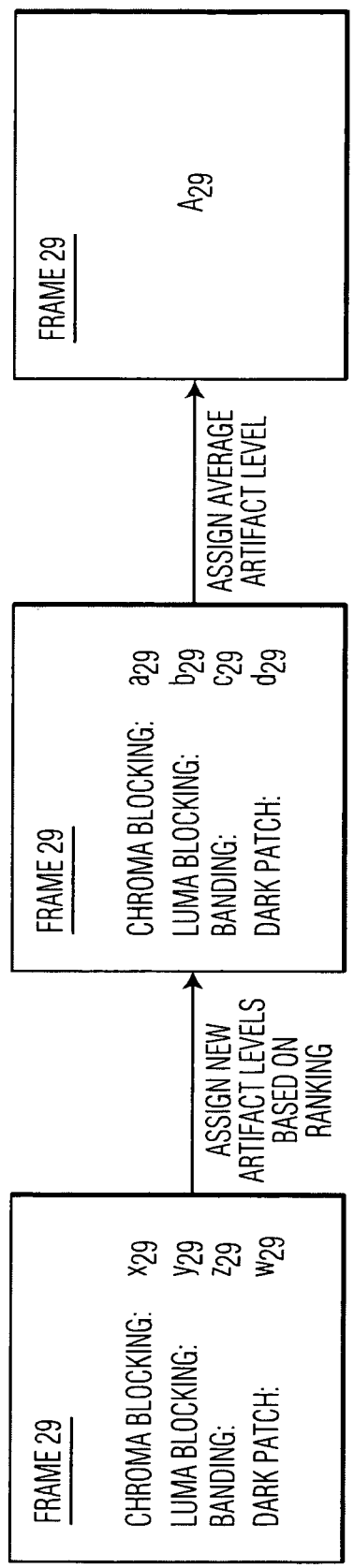
FIG. 6 is a flow diagram providing an example of a process performed by the decision module that includes assigning new artifact levels to frames and computing average artifact levels by considering various types of artifacts, their corresponding strengths, and, in some implementations, the content of the video data stream.

After compiling the lists, the decision module 110 sorts the entries in each artifact type list according to artifact strength level from highest to lowest (step 404 in FIG. 4), as illustrated in FIG. 5. The decision module 110 then may assign a new artifact level for each artifact type to each frame in the set based on the artifact strength level rankings in the sorted lists (step 406). The new level may correspond to a normalized artifact strength level or it may simply be the same artifact strength level provided by the artifact detector 80. In the example provided above, the frame would be assigned four new artifact levels in accordance with the list rankings, corresponding to luma blocking artifacts, chroma blocking artifacts, banding artifacts and dark patches artifacts, represented by a, b, c and d, respectively, in FIG. 6. Next, the decision module 110 computes the average of the previously assigned, rank-based artifact levels for each frame in the set (step 408), which is denoted by "A" in FIG. 6.

Figure 7:
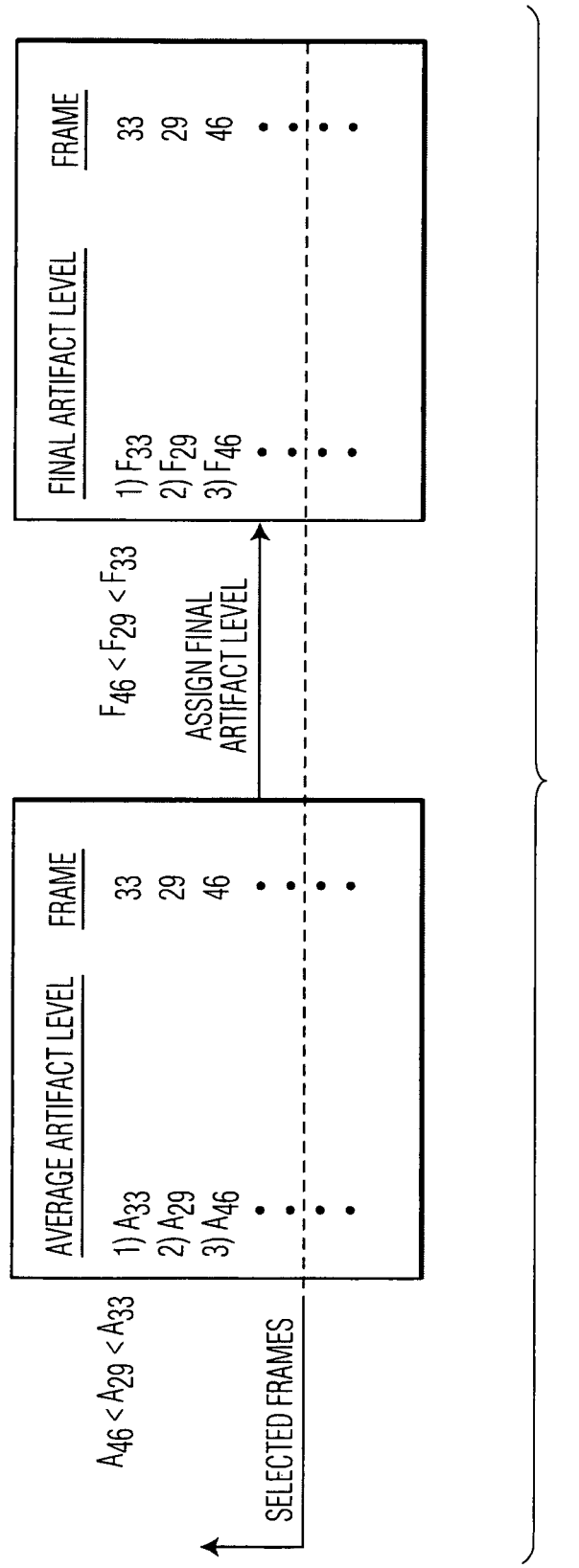
FIG. 7 is an exemplary representation of frames that are sorted in accordance with an average artifact level, assigned a final artifact level and selected for artifact correction.
Figure 8:
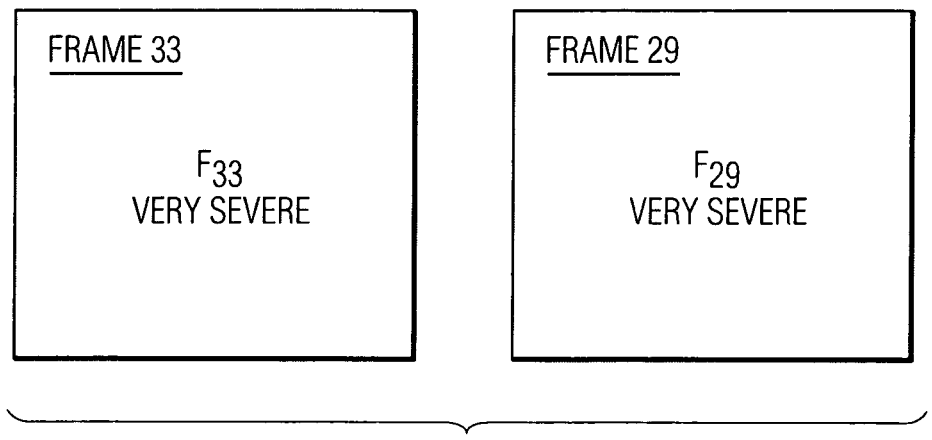
FIG. 8 is an exemplary representation of classified frames.

Subsequent to computing the average artifact level for each frame, the decision module 110 sorts the frames in accordance with the average artifact level in descending order (step 410), as shown, for example in FIG. 7. The decision module 110 then assigns a final artifact level, "F" in FIG. 7, to each frame based on the average artifact level ranking (step 412). The frames with the highest final artifact levels are selected for artifact correction and the decision module 110 thereafter provides the correction module 120 with the selected frames 116 to be corrected, or alternatively, an indication of the frames to be corrected. Additionally, the decision module 110 may classify sets of frames in accordance with the final artifact level (step 414). For example, pictures may be classified as having very severe, severe, moderate, mild, or very mild artifacts according to the position of the frame in the average artifact levels list, as illustrated in FIG. 8. The classification may be provided to the correction module 120 with an instruction to correct pictures above a specified severity classification.

According to one implementation of the present principles, the number of frames to be corrected, or, conversely, a threshold value, is based on the configuration data described above. For instance, the configuration data may specify the percentage of pictures to be corrected in a sequence of video frames. Alternatively, the decision module 110 may dynamically decide the number of frames to be selected for correction in accordance with the available bit rate, which also may constitute configuration data as described above. The available bit rate corresponds to the number of unused bits in a bit budget allocated to the encoding process. For example, if the encoding process is allocated a bit budget of M bits and uses only N bits, N being smaller than M, to encode the video stream, the available bit rate for artifact correction is equal to M-N bits. The number of frames corrected can be increased if the available bit rate is high and decreased if the available bit rate is low.

Additionally, in other implementations of the present principles, the final artifact strength levels or the artifact strength levels provided by artifact map may be used to determine the number of frames that are corrected. For instance, the decision module 110 may estimate the number of bits required to correct the frame with the highest final artifact level in a set of frames. If the available bit rate is greater than the bit rate required to correct the frame with the highest final artifact level, the decision module 110 then computes the bit rate required to correct the frame with the second highest average artifact level and determines whether the available bit rate is greater than the combined bit rate required to correct both frames. The decision module 110 continues the process until the bit rate required to correct a number of frames exceeds the available bit rate and thereby determines the number of frames to be corrected.

In a more specific implementation, the decision module 110 also considers the content of the video frames when selecting video frames to be corrected, as certain types of artifacts tend to be more prevalent than others in certain categories of video content. For instance, in video frames with animation content, banding artifacts are most perceptible, while in movie content, blocking artifacts have a tendency to be dominant. According to one aspect of the present principles, the decision module 110 considers the content of the video frames and weighs particular artifact types more than others when computing the average artifact level, "A," for a frame. By way of non-limiting example, the decision module 110 weights the average artifact level towards higher blocking artifact levels if the video is comprised of movie content and biases the average towards higher banding artifact levels if the video is comprised of animation content. Moreover, it should be noted that in another implementation, the artifact detector 80 may include the weighting factor in the artifact strength levels provided in the artifact map 122.

In the exemplary implementations described above, the present principles prioritize frames with artifacts that are most perceptible to a viewer by considering at least one or more of the severity of artifacts within video frames, the artifact types present in video frames, and the content of the video stream. Thus, when an encoder has limited resources or is constrained by a target bit rate for a compressed video frame sequence, the present principles facilitate correction of frames with the most perceptible artifacts to thereby provide a high quality video stream despite limited resource constraints imposed on an encoder.

Figure 9:
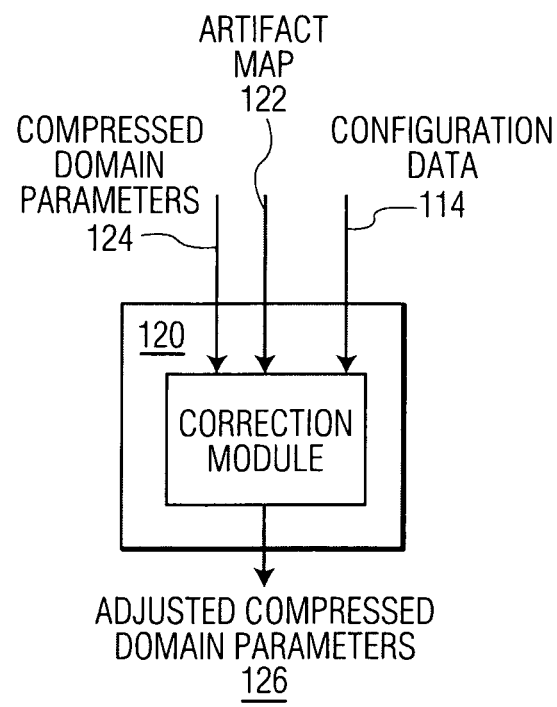
FIG. 9 is a flow diagram of an exemplary implementation of a correction module.
Figure 10:
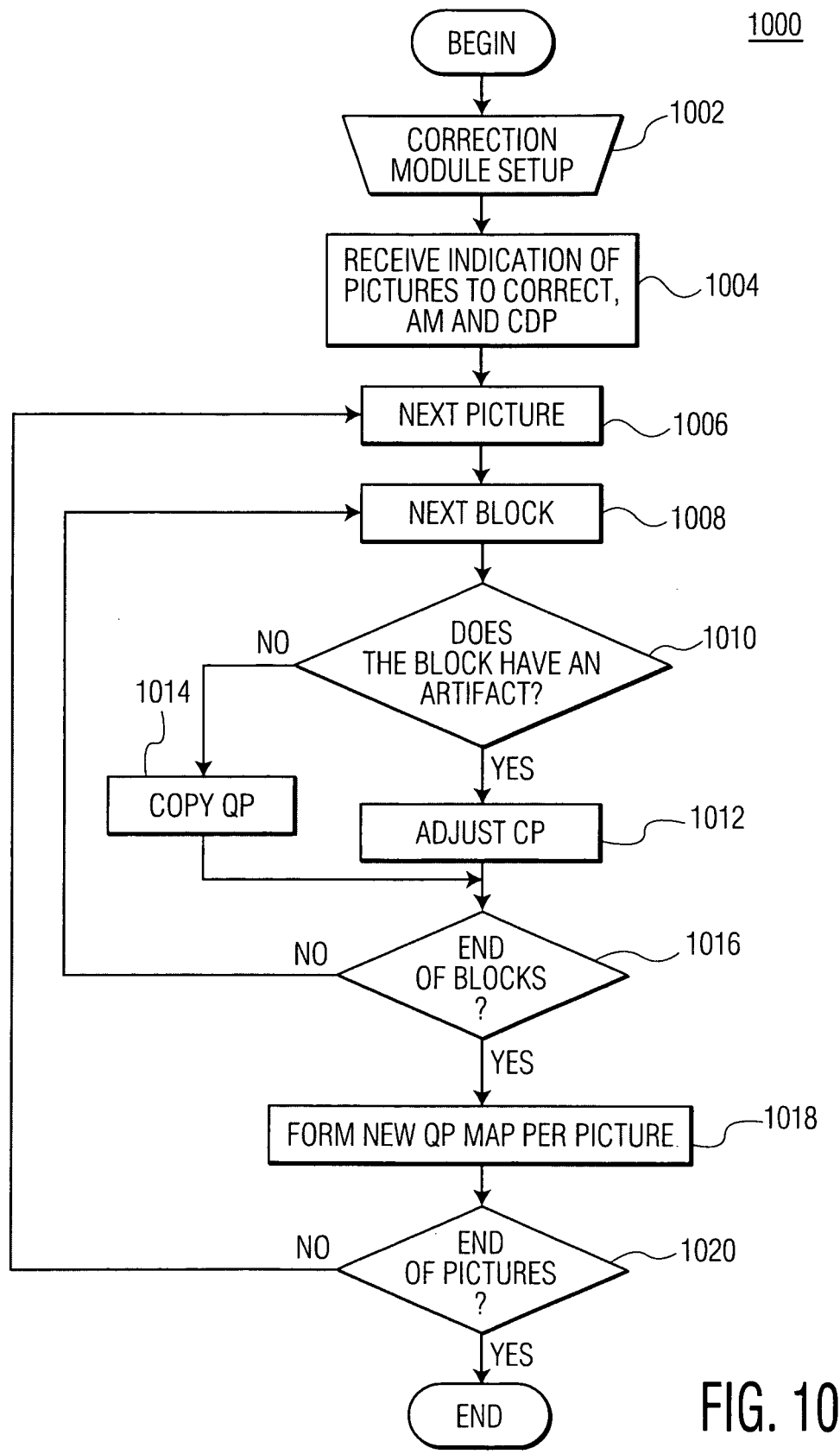
FIG. 10 is a flow diagram illustrating an example of an artifact correction process based on adjusting the quantization parameter of blocks of pictures selected by the decision module, as performed by the correction module.

Subsequent to prioritization, as discussed above, the correction module 120 receives an indication of which pictures in a sequence of pictures to correct. It should be noted that although the correction module may be included in an artifact correction unit, as depicted in FIGS. 1 & 2, the correction module may also be a stand alone device as shown in FIG. 9. FIG. 10 illustrates one implementation of the artifact correction process performed by the correction module 120. The process begins by receiving an indication of the pictures to correct (step 1004) after correction module setup (step 1002). Additionally, the correction module also receives an artifact map and compressed domain parameters for each frame to be corrected (step 1004). The artifact map and compressed domain parameters may be provided by encoder 90 or any other type of operator. The compressed domain parameters may comprise quantization parameters and/or mode decisions, in addition to other types of compressed domain parameters, such as DCT coefficients, corresponding to blocks within frames to be corrected. For simplicity purposes, the example provided in FIG. 10 only adjusts the quantization parameter. However, it should be understood that the present principles may be adapted to additionally or alternatively adjust other compressed domain parameters.

Figure 11:
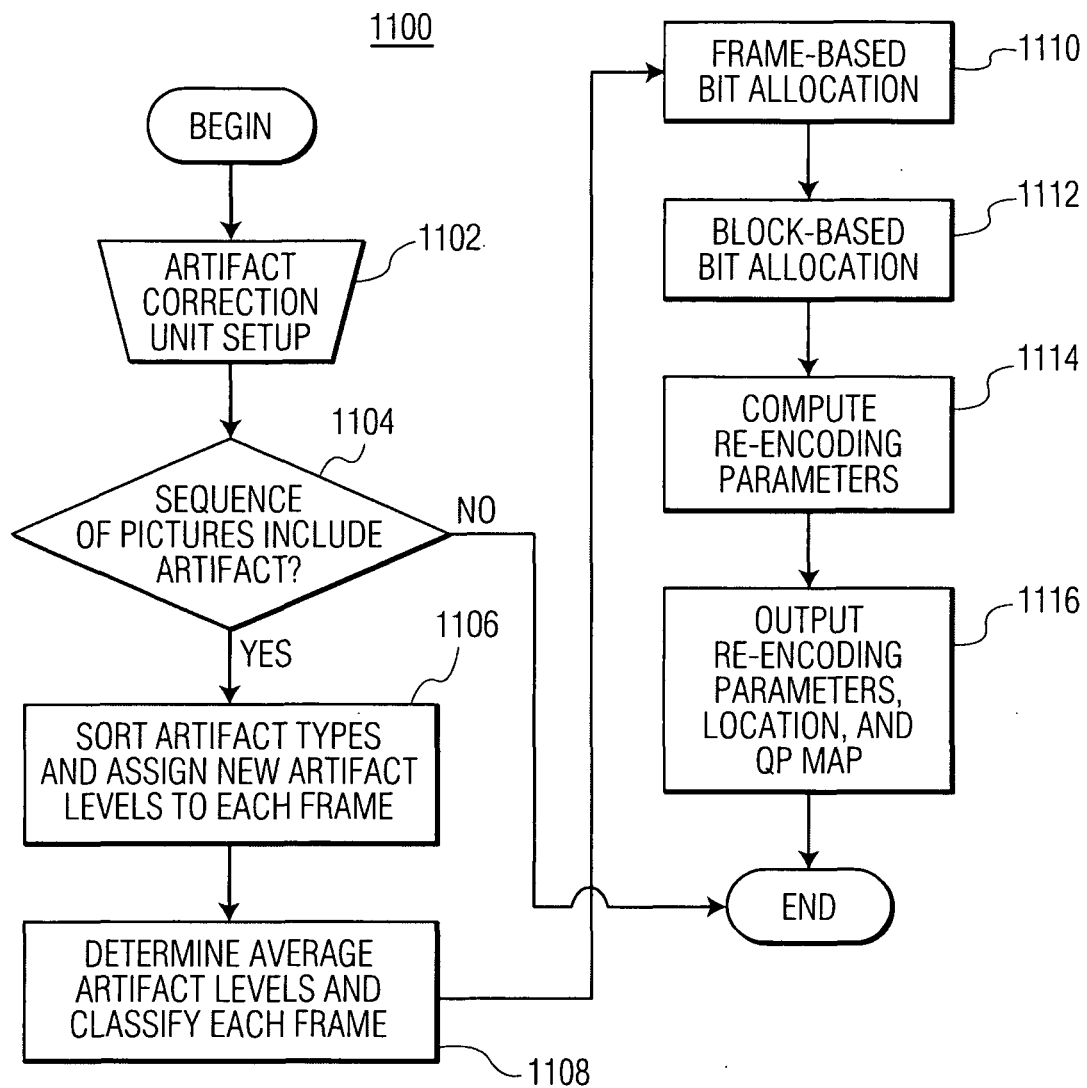
FIG. 11 is a flow diagram depicting an example of an artifact correction process based on considering various artifact types and strengths and, in some implementations, the content of video pictures, to adjust the quantization parameters of blocks of pictures that include artifacts.

After receiving an indication of the pictures to correct 116, artifact maps and configuration parameter information, the correction module 120 examines an artifact map corresponding to a picture to be corrected (step 1006). Using the artifact map, the correction module 120 may have the ability of detecting which blocks within the picture are affected by artifacts. If this information is available, artifact correction could be performed not only by modifying frame-level encoding parameters (e.g. deblocking filter), but also macro block (MB) level encoding parameters (e.g. quantization parameter QP). The correction module 120 scans each block within the artifact map of a picture and determines whether the block includes an artifact (steps 1008, 1010). Upon finding a block with an artifact, the correction module 120 adjusts the quantization parameter for the block (step 1012), as more fully described below. If the correction module does not find an artifact, then it applies the original quantization parameter used to compress the block (step 1014). Thereafter, the correction module 120 scans the next block in the picture (step 1008). After processing all the blocks within a picture, the correction module 120 forms a quantization parameter map for the picture (step 1018), indicating the adjusted quantization parameters corresponding to each block of the picture. Subsequently, the correction module 120 examines an artifact map corresponding to the next picture to be corrected (step 1006) and repeats the quantization parameter adjustment method until all of the indicated pictures have been processed. The overall work flow of the artifact correction unit 100, including the processes performed by both the decision module 110 and the correction module 120, is provided in FIG. 11.

The quantization parameter may be adjusted in various ways according to the present principles. As described above, the quantization parameter is correlated to a scaling factor applied to DCT coefficients to remove less perceptible features of a picture. Generally, lower quantization parameter values correspond to a finer scale representation of the DCT coefficients. Thus, lowering the quantization parameter allows for a more accurate reconstruction of the original pixel values and reduces the appearance of artifacts, especially blocking and banding artifacts.

Figure 12:
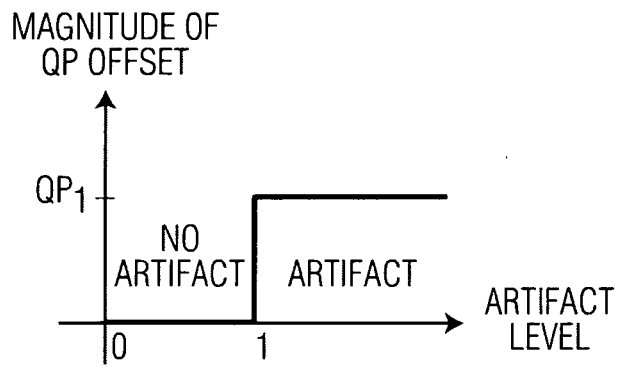
FIG. 12 is a graph depicting an example of bi-level quantization parameter offsets that may be employed during artifact correction.

According to one implementation of the present principles, the correction module 120 offsets the quantization parameter for a block including an artifact by a predetermined amount. The same predetermined offset is applied to every block that includes an artifact in its entirety, as illustrated in FIG. 12, showing the absolute value of the quantization parameter offset. This approach is best taken when the artifact correction unit 100 employs an artifact map that does not indicate artifact strength (binary artifact map).

Figure 13:
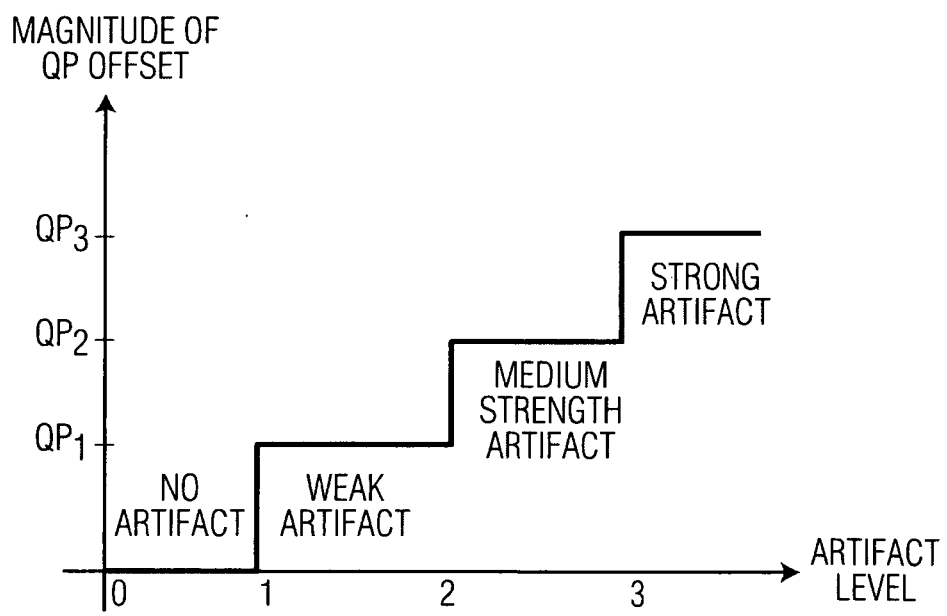
FIG. 13 is a graph depicting an example of multi-level quantization parameter offsets that may be employed during artifact correction.

In another implementation of the present principles, the quantization parameter offset applied to blocks including artifacts are different and correspond to the strength level of the artifacts in the block, as shown in FIG. 13, depicting the absolute value of the quantization parameter offsets. For example, QP1 represents an offset magnitude corresponding to a weak artifact; QP2 represents a different offset magnitude corresponding to a medium strength artifact, and QP3 represents another offset magnitude corresponding to a strong artifact. The strength of an artifact may be may be obtained by referencing an artifact map provided by artifact detector 80. If the artifact map utilized is binary, an external strength detector may alternatively be employed to determine the strength of artifacts within a block. As in the previously described implementation, the quantization parameter offset is applied to the entire block that includes at least one artifact. It should be appreciated that any number of offset values and corresponding artifact strengths may be employed. Moreover, the sizes of the blocks of a picture may be varied as well.

It should be understood that any quantization parameter offset for either implementation is dependent on the target bit rate. The correction module 120 selects a quantization parameter adjustment magnitude that results in a bit rate that is at or below the target bit rate of the video stream. Moreover, the magnitude of the quantization parameter offset for either implementation may also be dependent upon artifact strength levels 118 provided by the decision module 110. For example, lower artifact strength levels require lower quantization parameter offset. Furthermore, higher artifact strength levels necessitate greater quantization parameter offset and may also require adjustment of other parameters, such as deblocking filter parameters and rounding offsets.

Additionally, in accordance with another aspect of the present principles, the correction module 120 may utilize a complexity model to determine the resulting bit rate after parameter adjustment. The correction module 120 could be integrated into an encoder or perform at least part of an encoding process in order to estimate the number of bits required to correct an artifact. The complexity model estimates the resulting bit rate by considering the original quantization parameter, the original magnitude of bits allocated per block and the newly assigned quantization parameter. However, other means for determining the resulting bit rate may also be employed.

Figure 14A:
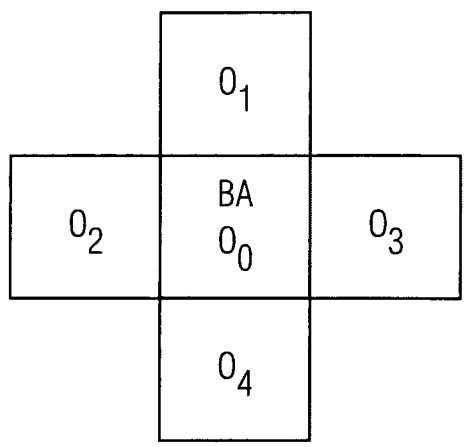
FIGS. 14A & 14B are representations of examples of blocks to which quantization parameter offsets may be applied.
Figure 14B:
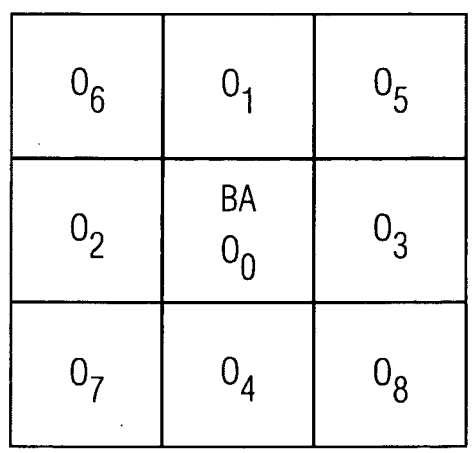

According to another implementation of the present principles, quantization parameters of blocks surrounding a block including an artifact, "BA" in FIG. 14, may be adjusted. As depicted in FIGS. 14A and 14B, for example, the surrounding blocks may be adjusted according to offsets $O_0, O_1, O_2, O_3 \ldots$. Both the number of blocks offset and the magnitude of the offsets may be varied according to the present principles. Moreover, the quantization parameter of neighboring blocks may be adjusted even if the neighboring blocks do not comprise artifacts. Offsetting the quantization parameter of neighboring blocks ensures that the video quality of a frame is consistent, as abrupt variations of quantization parameters of neighboring blocks result in visually perceptible differences between blocks in a frame. To maintain perceptually consistent video quality, in accordance with one aspect of the present principles, the magnitude of quantization parameter offsets of neighboring blocks are varied gradually and outwardly from a block including an artifact. Moreover, the size of the neighborhood of blocks surrounding a block with an artifact in which the quantization parameters are varied may also be dependent on the magnitude of the quantization parameter adjustment of the block including an artifact.

However, it should be appreciated that, to generate a video stream with improved quality, the quantization parameter of the surrounding blocks may either be increased or decreased, as necessary. For example, the quantization parameter of surrounding blocks may be decreased if they include artifacts of strength and type that warrant their correction, as is often the case when artifacts span several blocks.

In addition, the magnitude of the quantization parameter offset may also be dependent on the modes of blocks surrounding the artifact. A common method of encoding a sequence of video frames comprises motion compensation, in which differences between video frames are encoded to reduce the memory required to store the video sequence. In this encoding scheme, blocks may be encoded in either inter-mode or intra-mode. An inter-block is decoded by referring to another block while intra-block may be decoded without reference to any other block. Naturally, intra-blocks include more information than inter-blocks. Thus, intra-blocks typically require a lower quantization parameter offset magnitude than inter-blocks to correct an artifact. In one aspect of the present principles, the correction module 120 determines the quantization parameter offset magnitude in accordance with the mode of the block it is adjusting. Similarly, the correction module 120 may determine any quantization parameter offset of surrounding blocks by considering their respective modes. It should be understood that adjusting the quantization parameter of an intra-block inevitably affects the compression and encoding of any inter-blocks in prior or subsequent pictures of the video sequence that refer to the intra-block, as the inter-blocks incorporate information stored in the intra-block.

As mentioned above, although the present principles have been described with respect to adjustment of the quantization parameter of blocks of pictures to reduce the incidence and severity of artifacts, other compressed domain parameters may additionally or alternatively be adjusted. For example, according to one implementation of the present principles, the mode decisions corresponding to blocks may be adjusted. As described above, intra-blocks include more information, and thus, more bits, than inter-blocks. To correct artifacts within an inter-block, the correction module 120 may convert the block to an intra-block to eliminate or reduce the severity of artifacts. In addition, according to another aspect of the present principles, the correction module 120 may also convert surrounding blocks, which either include artifacts or do not include artifacts, as described above with respect to adjustment of quantization parameters. By way of non-limiting example, the correction module 120 may additionally convert previously encoded surrounding intra-blocks into inter-blocks to maintain the target bit rate.

Upon completion of the compressed domain parameter adjustment, the correction module 120 provides encoder 130, or a different compression operator, with the adjusted compressed domain parameters 126 and the pictures or scenes to be corrected 128. As discussed above, the adjusted compressed domain parameters 126 may be furnished in the form of quantization parameter maps. Thereafter, the encoder 130 utilizes an artifact corrector 140 to compress the indicated pictures according to the artifact correction compressed domain parameters 126 and thereby provide a video stream with a lower incidence and severity of artifacts.

It should be appreciated that a system implementing the present principles, as depicted, for example, in FIG. 2, may also include a user-interface (not shown). According to this implementation, a user may be notified of the types of artifacts present in pictures of a video sequence via the user-interface. Additionally, a user may be notified of the classification of a video picture according to the severity of the artifacts present in a picture. For example, as stated above, the artifact correction unit 120 may classify a picture as being very severe, severe, moderate, mild, or very mild according to the computed final artifact levels of pictures.

Features and aspects of described implementations may be applied to various applications. Applications include, for example, DVD disk authoring and other professional equipment for non-real time compression applications. The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data transmission and reception. Examples of equipment include video coders, video decoders, video codecs, web servers, set-top boxes, laptops, personal computers, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream, and modulating a carrier with the packetized stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are within the scope of the following claims.

The invention claimed is:

1. A video processing method comprising:
   generating a plurality of metrics associated with a plurality of video compression artifact types present in a video picture included in a sequence of video pictures, wherein each metric indicates a severity of a respective one of said artifact types in said video picture and wherein each of said artifact types is characterized by a respective visible distortion of said artifact type; and
   correcting said video picture in response to said plurality of metrics.

2. The method of claim 1, wherein said artifact types include a first artifact type and a second artifact type, wherein said metrics include a first metric for said first artifact type and a second metric for said second artifact type, said method further comprising the steps of:
   determining a content type categorizing said sequence of video pictures;
   determining an average artifact level for said video picture in response to said first and second metrics, wherein said first metric for said first artifact type is weighed more than said second metric for said second artifact type in accordance with the content type of the sequence of video pictures when computing the average artifact level; and
   selecting said video picture from the sequence of video pictures for correction in accordance with the determined average artifact level.

3. The method of claim 2, wherein said selecting step is performed in response to prioritizing the pictures in accordance with said metrics.

4. The method of claim 2, wherein said content type includes at least one of animation content type and movie content type.

5. The method of claim 1, wherein said video compression artifact types comprise at least one of: a blocking artifact type, a banding artifact type, a dark patch artifact type and a ringing artifact type.

6. The method of claim 1, wherein said correcting step includes utilizing an artifact map to correct a first block including an artifact of said picture.

7. The method of claim 6, wherein said artifact map is segmented into blocks of a fixed size.

8. The method of claim 6, wherein said correcting step further comprises correcting a second block that does not include an artifact.

9. The method of claim 1, wherein said correcting step further comprises adjusting at least one of a quantization parameter and a mode decision corresponding to at least one block of said video picture.

10. The method of claim 1, further comprising the steps of:
    providing a user-interface; and
    notifying a user of at least one type of artifact present in said video picture.

11. The method of claim 10, including the step of:
    classifying said video picture in accordance with the severity of at least one artifact; and
    notifying the user of the classification of said video picture.

12. A processing system comprising:
    a unit configured to generate compressed domain parameters in response to a plurality of metrics associated with a plurality of video compression artifact types present in a video picture included in a sequence of video pictures, wherein each metric indicates a severity of a respective one of said artifact types in said video picture and wherein each of said artifact types is characterized by a respective visible distortion of said artifact type; and
    a processor configured to correct said video picture in accordance with said compressed domain parameters.

13. The system of claim 12, wherein said artifact types include a first artifact type and a second artifact type, wherein said metrics include a first metric for said first artifact type and a second metric for said second artifact type, and wherein an artifact correction unit is configured to determine an average artifact level for said video picture in response to said first and second metrics, wherein said first metric for said first artifact type is weighed more than said second metric for said second artifact type in accordance with the content type of the sequence of video pictures when computing the average artifact level, and
    select said video picture from the sequence of video pictures for correction in accordance with the determined average artifact level.

14. The system of claim 13, wherein the artifact correction unit is configured to select said picture in response to prioritizing the pictures in accordance with said metrics.

15. The system of claim 13, wherein said content type includes at least one of animation content type and movie content type.

16. The system of claim 12, wherein said video compression artifact types include at least one of: a blocking artifact type, a banding artifact type, a dark patch artifact type and a ringing artifact type.

17. The system of claim 13, wherein said artifact correction unit utilizes an artifact map to correct a first block including an artifact of said picture.

18. The system of claim 17, wherein said artifact map is segmented into blocks of a fixed size.

19. The system of claim 17, wherein said artifact correction unit is configured to correct a second block of said picture that does not include an artifact.

20. The system of claim 13, wherein said artifact correction unit is configured to adjust at least one of a quantization parameter and a mode decision corresponding to at least one block of said video picture.

21. The system of claim 12, comprising:
a user-interface configured to notify a user of at least one type of artifact present in said video picture.

22. The system of claim 21, wherein said unit is configured to generate a classification of said video picture in accordance with the severity of at least one artifact and said user-interface is configured to notify the user of the classification of said video picture.

* * * * *